(12) United States Patent
Baehr-Jones et al.

(10) Patent No.: US 10,200,143 B2
(45) Date of Patent: Feb. 5, 2019

(54) OPERATION AND STABILIZATION OF MOD-MUX WDM TRANSMITTERS BASED ON SILICON MICRORINGS

(71) Applicant: Elenion Technologies, LLC, New York, NY (US)

(72) Inventors: Thomas Baehr-Jones, Arcadia, CA (US); Yang Liu, Elmhurst, NY (US); Ran Ding, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 15/916,557

(22) Filed: Mar. 9, 2018

(65) Prior Publication Data

US 2018/0198549 A1 Jul. 12, 2018

Related U.S. Application Data

(63) Continuation of application No. 15/217,152, filed on Jul. 22, 2016, now Pat. No. 9,941,990, which is a continuation of application No. 14/514,771, filed on Oct. 15, 2014, now Pat. No. 9,425,919.

(60) Provisional application No. 61/891,025, filed on Oct. 15, 2013.

(51) Int. Cl.
| | |
|---|---|
| *H04B 10/516* | (2013.01) |
| *H04B 10/50* | (2013.01) |
| *H04J 14/02* | (2006.01) |
| *H04B 10/564* | (2013.01) |
| *H04B 10/54* | (2013.01) |

(52) U.S. Cl.
CPC ............ *H04J 14/02* (2013.01); *H04B 10/503* (2013.01); *H04B 10/506* (2013.01); *H04B 10/54* (2013.01)

(58) Field of Classification Search
CPC .............................. H04J 14/02; H04J 14/0201
USPC ......................................... 398/76, 79, 67, 43
See application file for complete search history.

(56) References Cited

U.S. PATENT DOCUMENTS

| | | | | |
|---|---|---|---|---|
| 8,649,688 | B2* | 2/2014 | McGhan | H04L 27/2028 359/279 |
| 8,909,000 | B2* | 12/2014 | Meade | G02B 6/12007 359/238 |
| 9,020,351 | B1* | 4/2015 | Wach | H04J 14/02 398/79 |
| 2004/0240771 | A1* | 12/2004 | Driessen | H04J 14/02 385/14 |
| 2006/0153267 | A1* | 7/2006 | Suzuki | G02B 6/12007 372/92 |
| 2010/0098372 | A1* | 4/2010 | Manipatruni | G02B 6/12007 385/2 |

(Continued)

*Primary Examiner* — Oommen Jacob
(74) *Attorney, Agent, or Firm* — Nixon Peabody LLP

(57) ABSTRACT

A transmitter comprising a plurality of modulator and multiplexer (Mod-MUX) units, each Mod-MUX unit operating at an optical wavelength different from the other Mod-MUX units. The transmitter can additional include in each Mod-MUX unit two optical taps and three photodetectors that are configured to allow the respective Mod-MUX unit to be tuned to achieve thermal stabilization and achieve effective modulation and WDM operation across a range of temperatures. The Mod-MUX transmitter avoids the use of a frequency comb. The Mod-MUX transmitter avoids cross-modulation between different modulators for different laser signals.

19 Claims, 4 Drawing Sheets

(56) References Cited

U.S. PATENT DOCUMENTS

| | | | |
|---|---|---|---|
| 2011/0310917 A1* | 12/2011 | Krishnamoorthy | ............................ H01S 5/06821 372/23 |
| 2012/0057866 A1* | 3/2012 | McLaren | ............ G02B 6/12007 398/25 |
| 2012/0237155 A1* | 9/2012 | Zheng | ................ G02B 6/12007 385/2 |
| 2014/0003761 A1* | 1/2014 | Dong | .................... G02F 1/2257 385/3 |
| 2014/0321848 A1* | 10/2014 | Sekiguchi | ............. G02F 1/0123 398/38 |
| 2015/0104176 A1* | 4/2015 | Baehr-Jones | ........... H04J 14/02 398/79 |
| 2015/0261061 A1* | 9/2015 | Akiyama | ................ G02F 1/225 385/2 |
| 2015/0323743 A1* | 11/2015 | Nicholson | ............ H04B 10/506 385/14 |
| 2016/0139484 A1* | 5/2016 | Casasanta, III | ........ G02B 6/138 385/2 |
| 2016/0204578 A1* | 7/2016 | Li | ............................ H01S 5/142 372/20 |
| 2016/0336718 A1* | 11/2016 | Takabayashi | ......... H01S 5/0612 |
| 2016/0352515 A1* | 12/2016 | Bunandar | ............. H04L 9/0852 |
| 2017/0010485 A1* | 1/2017 | Amberg | ................ G02F 1/0121 |

* cited by examiner

OPERATION AND STABILIZATION OF MOD-MUX WDM TRANSMITTERS BASED ON SILICON MICRORINGS

CROSS-REFERENCE TO RELATED APPLICATIONS

This application is a continuation of U.S. patent application Ser. No. 15/217,152, filed Jul. 22, 2016, now allowed, which is a continuation of and claims priority to U.S. patent application Ser. No. 14/514,771, filed Oct. 15, 2014, now U.S. Pat. No. 9,425,919, which claims priority to U.S. Provisional Application No. 61/891,025, filed Oct. 15, 2013, each of which is hereby incorporated by reference herein in its entirety.

FIELD OF THE INVENTION

The invention relates to optical transmitters in general and particularly to an optical transmitter that employs wavelength division multiplexing.

BACKGROUND OF THE INVENTION

Wavelength division multiplexing (WDM) system has attracted more and more interest in the past several years for building ultra-high aggregated data rate optical network and optical interconnects, given that interconnection has been considered as the bottleneck for the next-generation computing systems. Microring resonators are one of the most popular devices to form the important building blocks of on-chip network and optical interconnects, owing to their small footprint, small capacitance and low power consumption. Much progress has been made in the past decade in designing and demonstrating microring-based modulators, filters, switches, lasers, and other structures.

The commonly used ring-based WDM transmitter architecture is shown in FIG. 1, in which a series of ring modulators share one bus waveguide. This architecture is referred to as "common-bus" architecture. This configuration does not require each ring modulator to be associated with a specific wavelength in the WDM system. Instead it offers the flexibility of assigning rings to the closest wavelength so as to minimize the overall tuning power. However, a comb laser or pre-multiplexed laser sources are required at the common input and cross-modulation may be introduced since the light in the bus waveguide passes through multiple ring resonator modulators.

Automated thermal stabilization is particularly challenging in the common-bus design, due to the fact that multiple wavelengths are always present at the bus waveguide and interact with each ring modulator but the monitoring photo detector is naturally insensitive to wavelength.

There is a need for an improved apparatus for multiplexing a plurality of wavelengths onto a common optical fiber.

SUMMARY OF THE INVENTION

According to one aspect, the invention features an optical modulator system. The system comprises a plurality of input stages, each input stage of the plurality of input stages configured to operate at an optical wavelength distinct from the optical wavelengths of operation of the others of the plurality of input stages, each input stage comprising an optical input port configured to receive a light having a distinct optical wavelength from a laser, a first modulator configured to modulate the light having a distinct optical wavelength with information carried by a modulation signal to produce a modulated light signal on the distinct optical wavelength as a carrier wavelength, and a filter multiplexer configured to add the modulated light signal on the distinct optical wavelength as a carrier wavelength onto an optical bus configured to carry at least two light signals having different carrier wavelengths.

In one embodiment, the optical modulator system further comprises in at least one of the plurality of input stages a first signal splitter situated between the optical input port and the first modulator and a first optical detector configured to receive optical illumination from the first signal splitter; a second signal splitter situated between the first modulator and the filter multiplexer; and a second optical detector configured to receive optical illumination from the second signal splitter, and a third optical detector configured to receive optical illumination at a location beyond the filter multiplexer.

In another embodiment, the optical modulator system further comprises an optical bus having an output port in optical communication with each of the filter multiplexers, the optical bus configured to provide a multiplexed optical signal comprising the respective modulated light signals on the distinct optical wavelengths as carrier wavelengths as an output signal.

In yet another embodiment, the optical modulator is configured to operate according to a protocol selected from the group of protocols consisting of OOK, ASK, PSK, FSK, and PolSK.

In still another embodiment, the optical modulator is configured to operate as a transmitter and as a receiver.

In a further embodiment, the optical modulator is permitted to drift in wavelength, and a communicating optical receiver is tuned to receive the wavelength that drifts.

According to another aspect, the invention relates to a method of controlling a thermal regime in an optical modulator system. The method comprises providing an optical modulator system comprising a plurality of input stages, each input stage of the plurality of input stages configured to operate at an optical wavelength distinct from the optical wavelengths of operation of the others of the plurality of input stages, each input stage comprising: an optical input port configured to receive a light having a distinct optical wavelength from a laser, a first modulator configured to modulate the light having a distinct optical wavelength with information carried by a modulation signal to produce a modulated light signal on the distinct optical wavelength as a carrier wavelength, and a filter multiplexer configured to add the modulated light signal on the distinct optical wavelength as a carrier wavelength onto an optical bus configured to carry at least two light signals having different carrier wavelengths; in at least one of the plurality of input stages a first signal splitter situated between the optical input port and the first modulator and a first optical detector configured to receive optical illumination from the first signal splitter; a second signal splitter situated between the first modulator and the filter multiplexer; and a second optical detector configured to receive optical illumination from the second signal splitter, and a third optical detector configured to receive optical illumination at a location beyond the filter multiplexer; in a respective one of the plurality of input stages, observing the photocurrents on the first and second optical detectors; tuning a thermal tuner on the first modulator to achieve a desired ratio of photocurrents in the first optical detector and the second optical detector; and thereafter, tuning a thermal tuner on the filter multiplexer to minimize a photocurrent in the third optical detector, thereby maintaining operation of the optical modulator system over a range of temperatures.

According to another aspect, the invention relates to a method of operating an optical modulator system. the method comprises providing an optical modulator system comprising a plurality of input stages, each input stage of the plurality of input stages configured to operate at an optical wavelength distinct from the optical wavelengths of operation of the others of the plurality of input stages, each input stage comprising: an optical input port configured to receive a light having a distinct optical wavelength from a laser, a first modulator configured to modulate the light having a distinct optical wavelength with information to produce a modulated light signal on the distinct optical wavelength as a carrier wavelength, and a filter multiplexer configured to add the modulated light signal on the distinct optical wavelength as a carrier wavelength onto an optical bus configured to carry at least two light signals having different carrier wavelengths; providing to each of the plurality of input stages an optical input signal as a respective carrier wave, the respective carrier waves having a respective distinct optical wavelength; providing to each of the plurality of input stages a modulation signal that carries information to be modulated onto the carrier wave; and recovering a modulated signal having at least one of the respective carrier waves having the respective distinct optical wavelength at an output of the optical bus.

In one embodiment, the method further comprises providing at least one optical detector configured to receive an optical signal having a specific carrier wavelength in optical communication with a respective one of the filter multiplexers; receiving a modulated signal having the specific carrier wavelength at the filter multiplexer from the optical bus; detecting the modulated signal having the specific carrier wavelength with the at least one optical detector; and receiving from the at least one optical detector a signal comprising information encoded on the modulated signal, free of the specific carrier wavelength, which signal is configured to be displayed to a user, recorded in a non-volatile memory and/or transmitted to another device for further manipulation.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

We describe the Mod-MUX architecture for implementing a WDM transmitter using ring modulators. As compared to the conventional 'common-bus' architecture, the Mod-MUX architecture shows many advantages. We also describe a procedure that can be used to thermally stabilize the Mod-MUX transmitter automatically.

Figure 1:
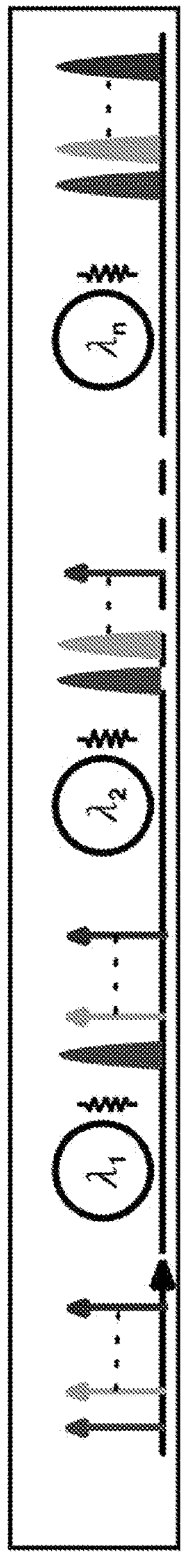
FIG. 1 is a diagram that illustrates a traditional prior art common bus architecture.
Figure 2:
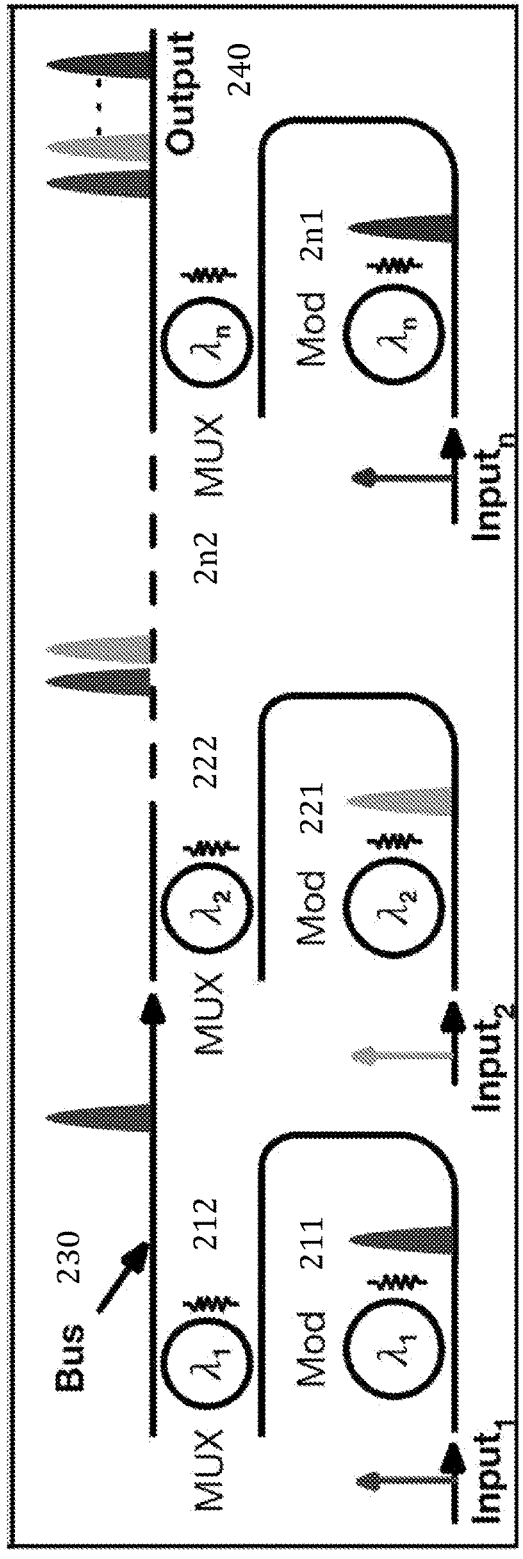
FIG. 2 is a schematic diagram that illustrates the apparatus and principle of operation of the Mod-MUX WDM transmitter architecture according to principles of the invention in which CW sources are fed into a ring modulator, and the modulated light is multiplexed onto the bus waveguide by a ring filter.

The Mod-MUX architecture o overcomes the weakness of the common-bus design. As shown in FIG. 2, in the Mod-MUX architecture the laser for each channel is first fed into a ring modulator (Mod) and then the modulated light is multiplexed onto the bus waveguide by a ring add-filter multiplexer (MUX). In FIG. 2, the first Mod-MUX operates at wavelength $\lambda_1$, the second Mod-MUX operates at wavelength $\lambda_2$, and the $n^{th}$ Mod-MUX operates at wavelength $\lambda_n$, where n is an integer greater than 1 that defines the number of discrete wavelengths that the Mod-MUX can accommodate.

In FIG. 2, each Mod-MUX has a respective optical input (210, 220, 2n0) that receives a carrier signal having wavelength different from the other carrier signal wavelengths, a respective modulator (211, 221, 2n1) that modulates the respective carrier signal with a signal in response to a data signal (e.g., information carried by a modulation signal) applied to the modulator to produce a modulated carrier signal, and a respective multiplexer (212, 222, 2n2) that multiplexers the modulated carrier signal onto a bus 230, so that the combined modulated signals are provided at an output 240. The output signal can be recorded, transmitted to another device, or displayed to user, possibly in digital form or in the form of an active/inactive indicator corresponding to a given wavelength. For convenience, a modulator and a multiplexer (a Mod-MUX) that operates on a single carrier signal having a specific wavelength as described may be referred to as a Mod-MUX unit.

This architecture offers several advantages. It removes the requirement of providing a comb source. It avoids cross-modulation, due to the fact each laser wavelength only passes through one ring modulator. The Mod-MUX offers compatibility to simpler thermal stabilization schemes compared to the common-bus architecture since each Mod-MUX branch operates with only one laser wavelength. A specific design can be provided for ring modulators and ring filters respectively to optimize the performance of each element, such as the best tunability with the maximum allowable quality factor (in the ring modulator) and sufficient bandwidth with low loss and low cross-talk (in the ring filter).

For proper operation, one should preferably monitor the optical power at the bus output when sending a tunable CW light into each input as illustrated in FIG. 2. One first tunes the filters to achieve the target channel spacing, and then one tunes the modulator resonances to approximately align with the respective filter. In principle, it is preferable that the laser wavelength should be at the peak of the optical filter to minimize loss and optical filtering of the data stream, and the modulator resonance preferably should be slightly off the laser wavelength just as it is in a single ring modulator to generate a desired extinction ratio.

In various embodiments, each modulator element may be a single ring or a multi ring. In other embodiments, the modulator element may be a different type of modulator such as a Mach Zehnder Interferometer (MZI), an electro-absorptive (EA) optical modulator, or a modulator of another type.

In some embodiments, the modulator elements may be specifically designed to thermally drift together (for instance by placing them physically close to one another in order to match them) so as to simplify the construction of a control system.

In some embodiments, the Mod-MUX transmitters may include additional taps, detectors, and similar elements useful for the creation of control systems.

In some embodiments, there may also be elements added to the rings, such as thermal tuners (heating and/or cooling elements), PIN junction tuners, and the like, in order to provide a "control knob" by which to control such operating parameters as operating temperature, bias signals, and the like.

In some embodiments, the resonators may be rings, disks, or other structures such as various linear cavities.

Automated Thermal Stabilization of Mod-MUX Transmitter

Figure 3:
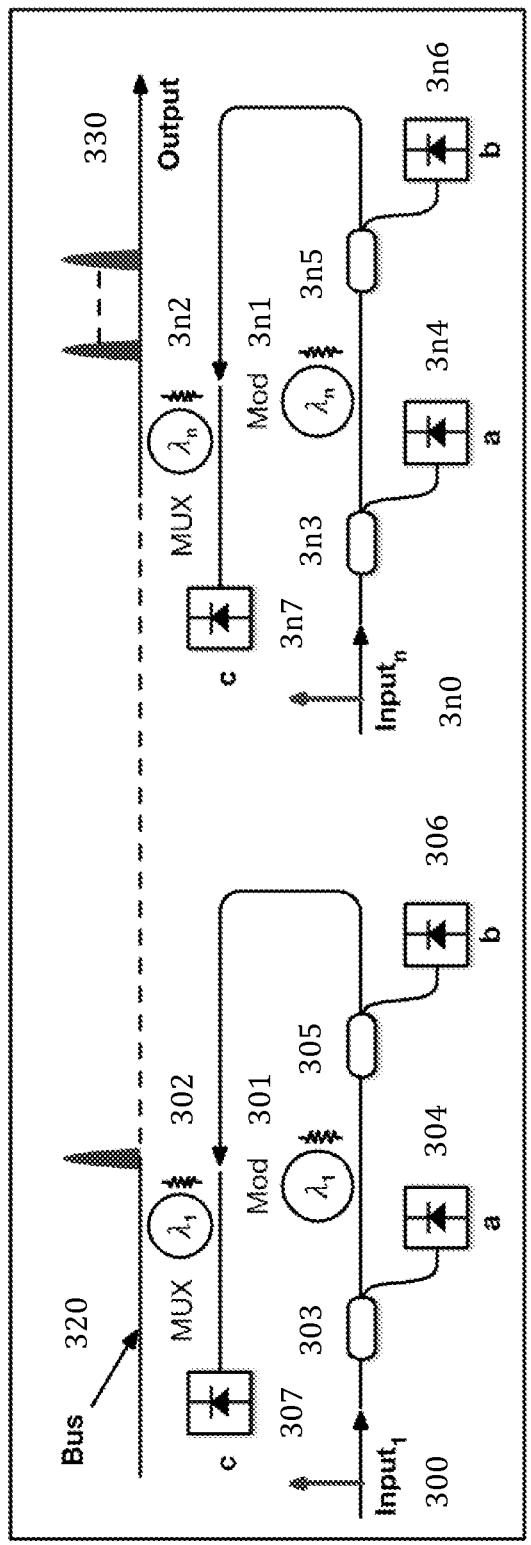
FIG. 3 is a schematic diagram that illustrates the apparatus and principle of operation of a Mod-MUX WDM transmitter according to principles of the invention that provides a convenient method of automated thermal stabilization.

Turning to FIG. 3, we now present an apparatus and a procedure to achieve automated thermal tuning of a Mod-MUX transmitter. The first Mod-MUX that operates at wavelength $\lambda_1$ includes input 300 where a carrier signal at wavelength $\lambda_1$ is introduced, modulator 301, MUX 302, tap 303, photodetector 304, tap 305, photodetector 306, and photodetector 307. The $n^{th}$ Mod-MUX that operates at wavelength $\lambda_n$ includes input 3n0 where a carrier signal at wavelength $\lambda_n$ is introduced, modulator 3n1, MUX 3n2, tap 3n3, photodetector 3n4, tap 3n5, photodetector 3n6, and photodetector 3n7. Bus 320 receives the respective modulated signals on carrier signals at wavelengths $\lambda_1, \lambda_2, \ldots, \lambda_n$ and provides the multiplexed result at an output port 330. In FIG. 3 Mod-MUX units that operate at only the two wavelengths $\lambda_1$ and $\lambda_n$ are illustrated. However, it should be understood that any convenient number of Mod-MUX units operating at different distinct wavelengths can be provided. In some embodiments, the taps are 95/5 taps. One can use other tap ratios, so long as the two taps are matched, and enough illumination intensity is provided so that the intensity can be measured while the intensity passed through the taps to the modulator is adequate. As seen in FIG. 3, the two taps (303, 305 and 3n3, 3n5) are inserted before and after the respective ring modulator 301, 3n1. The tapped out light intensity is fed into monitoring PDs (304, 306 and 3n4, 3n6) respectively. The third monitoring PD (307, 3n7) is connected to the through output of the respective ring filter 302, 3n2. Applying the following procedure on each branch will tune the ring modulators and filters so the transmitter can work properly.

For a selected Mod-MUX unit (for example, the leftmost unit in FIG. 3):

1. Tune the thermal turner on the ring modulator 301 and monitor the photo current $I_a$ and $I_b$ on the monitoring PD 304 (a) and PD 306 (b), respectively.
2. Stop tuning when $I_b/I_a$ achieves the desired bias loss.
3. Tune the thermal tuner on the ring filter, so that the photo current L on monitoring PD 307 (c) is minimized.

This technology enables the following:

1. The use of a two-level series of cascaded ring modulators to achieve wavelength-division modulation (WMD) and multiplexing (muxing) (e.g., the combination of optical signals at different wavelengths on a single optical fiber) as shown in FIG. 2, via a layer of independent ring modulators, followed by a set of ring modulators used to mux the individual signals on to a common optical bus.
2. The avoidance of a requirement for a comb source for WDM transmission based on a two-layer set of ring modulators, with one layer used for modulation, and the second layer for multiplexing.
3. The utilization of the architecture described herein to avoid cross-modulation between different ring modulators for different laser signals.
4. The utilization of the algorithm described in the section "Automated Thermal Stabilization of Mod-MUX Transmitter" to thermally stabilize a two-layer set of ring modulators and achieve effective modulation and WDM operation across a range of temperatures.

Figure 4:
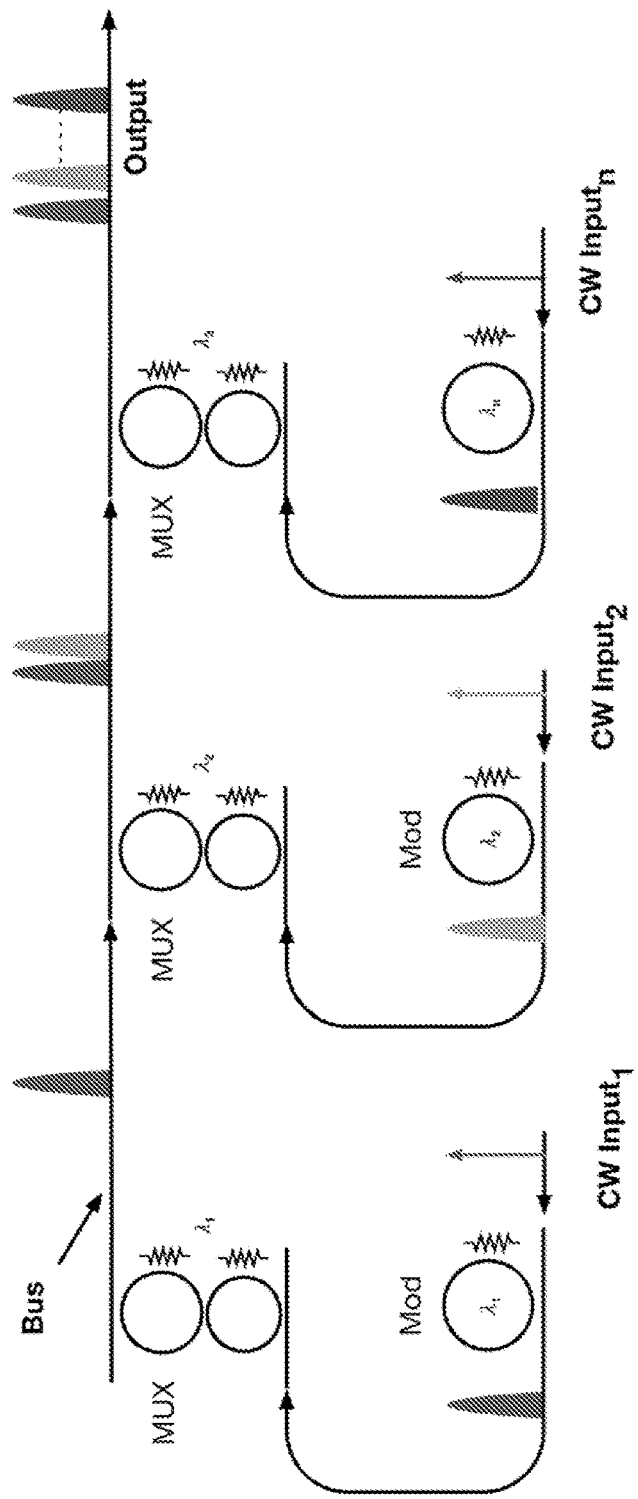
FIG. 4 is a schematic diagram that illustrates a Mod-MUX WDM transmitter architecture according to principles of the invention having multiple rings as the multiplexer unit.

FIG. 4 is a schematic diagram that illustrates a Mod-MUX WDM transmitter architecture according to principles of the invention having multiple rings as the multiplexer unit.

There are two advantages provided by the use of multiple rings in the multiplexer. First, the free spectrum range (FSR) of the two coupled rings will be much larger than a single ring due to the vernier effect, which expands the operation wavelength range of the transmitter. Second, the wavelength selection ability of two coupled rings is better than a single ring because the two ring filter is a higher order filter. In other words, the interference between the neighboring channels can be reduced.

Figure 5:
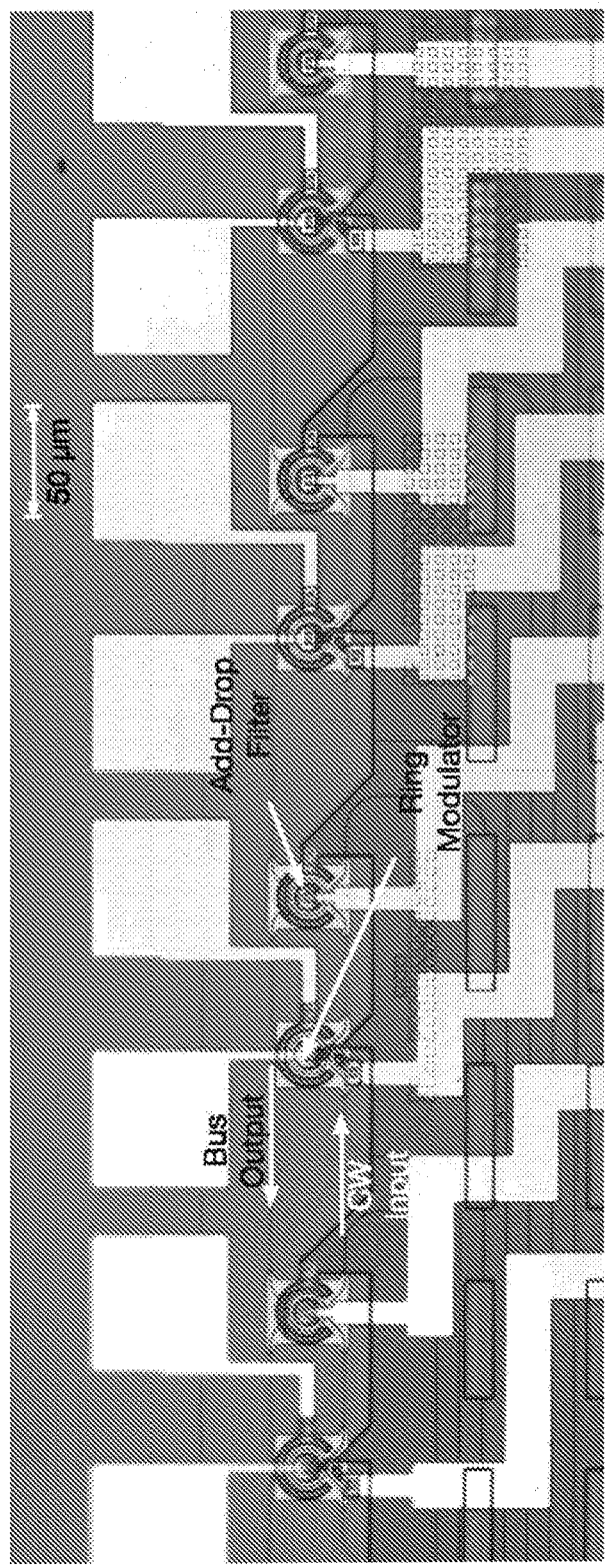
FIG. 5 is an image of a chip on which a Mod-MUX transmitter according to principles of the invention has been fabricated.

FIG. 5 is an image of a chip on which a Mod-MUX transmitter according to principles of the invention has been fabricated.

The transmitter was fabricated in a CMOS compatible photonics foundry. The process starts with an 8" Silicon-on-Insulator (SOI) wafer from SOITEC with 220 nm top silicon and 2 μm bottom oxide thickness. A high-resistivity handle silicon (750 Ω·cm) was used to ensure the RF performance. Grating couplers and silicon waveguides were formed by three dry etches. Six implantation steps were applied to silicon to form the pn junction and contact region. Two layers of aluminum were deposited for electrical interconnection. In all cases, 248 nm photolithography was utilized.

The fabrication process is further described in Liu, Yang, et al. "30 GHz silicon platform for photonics system." Optical Interconnects Conference, May 5, 2013, IEEE, and in Liu, Yang, et al. "Silicon Mod-MUX-Ring transmitter with 4 channels at 40 Gb/s." Optics Express 22 (2014): 16431-16438, Jun. 25, 2014, each of documents is hereby incorporated by reference herein in its entirety.

Applications

The present application can be used with well-known methods of transmitting information over optical communication networks. For example, such systems and methods are discussed in I. Djordjevic et al., Coding for Optical Channels, Chapter 2, Fundamentals of Optical Communication, pages 25-73, Springer, 2010, ISBN 978-1-4419-5569-2, which is said to describe optical components, different modulation formats with direct detection, and different modulation schemes with coherent detection, which document is hereby incorporated by reference herein in its entirety.

In order to exploit the enormous bandwidth potential of optical fiber systems, different multiplexing techniques (OT-DMA, WDMA, CDMA, SCMA), modulation formats (OOK, ASK, PSK, FSK, PolSK, CPFSK, DPSK, etc.), demodulation schemes (direct detection or coherent), and technologies can be employed.

Two types of external modulators commonly used in practice: Mach-Zehnder modulator (MZM) and electroabsorption modulator (EAM). Possible modulation formats that can be used with a MZM include: on-off keying (OOK) with zero/nonzero chirp, binary phase-shift keying (BPSK), differential phase-shift keying (DPSK), quadrature phase-shift keying (QPSK), differential QPSK (DQPSK), and return-to-zero (RZ) with duty cycle 33%, 50%, or 67%.

Basic optical modulation formats can be categorized as follows (1) On-Off Keying (OOK), where the 1 is represented by the presence of the pulse while the 0 by the absence of a pulse; (2) Amplitude-shift keying (ASK), where the information is embedded in the amplitude of the sinusoidal pulse; (3) Phase-shift keying (PSK), where the information is embedded in the phase; (4) Frequency-shift keying (FSK), where the information is embedded in the frequency; and (5) Polarization-shift keying (PolSK), where the information is embedded in the polarization. Various modulation formats can be used with direct detection, namely (1) non-returnto-zero (NRZ), (2) return-to-zero (RZ), (3) alternate mark inversion (AMI), (4) duobinary modulation, (5) carrier-suppressed RZ, (6) NRZ-differential phase-shift keying (NRZ-DPSK), and (7) RZ-differential phase-shift keying (RZ-DPSK).

Design and Fabrication

Methods of designing and fabricating devices having elements similar to those described herein are described in one or more of U.S. Pat. Nos. 7,200,308, 7,339,724, 7,424,192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141, each of which documents is hereby incorporated by reference herein in its entirety.

Operation

In some embodiments, the Mod-MUX transmitters of the invention are able to be used with various modulation formats, including OOK, ASK, PSK, FSK, and PolSK.

In some embodiments, the Mod-MUX transmitters of the invention can be allowed to drift in wavelength, rather than being thermally stabilized. In such embodiments the communicating receiver tunes itself in order to lock to the incoming wavelengths.

In some embodiments, the Mod-MUX transmitters of the invention can be used as either or both of a transmitter and a receiver. The transmitter structure has been described. For use as a receiver, at least one of the WDM rings leads to a detector, which can receive a demultiplexed signal from the optical bus. For bidirectional operation, e.g., as a transmitter and as a receiver (a transceiver), some of the MUX rings lead to modulators and some lead to detectors. For example, in FIG. 3, in one considers the first Mod-MUX that operates at wavelength $\lambda_1$, one could turn off the source of the carrier signal to input 300. One could recover a signal having a carrier at wavelength $\lambda_1$ from the bus 320 using MUX 302. One could detect the signal using any of tap 303 and photodetector 304, tap 305 and photodetector 306, and photodetector 307. One could thereby recover the information encoded on the carrier wave at a wavelength $\lambda_1$.

Definitions

Recording the results from an operation or data acquisition, such as for example, recording results at a particular frequency or wavelength, is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A WDM transmitter system, comprising:
   an optical bus including a port for outputting a combined modulated signal;
   a first tunable modulator configured to modulate a first optical signal from a first light source at a first optical wavelength with information carried by a first modulation signal to produce a first modulated light signal, the first tunable modulator configured to be tunable to a first desired bias loss based on the first optical signal before the first tunable modulator and the first modulated light signal after the first tunable modulator;
   a first tunable filter multiplexer optically coupled to the optical bus for adding said first modulated light signal onto the optical bus and passing other light to a first through output, the first tunable filter multiplexer capable of being tuned, based on minimizing light at the first through output;
   a second tunable modulator configured to modulate a second optical signal from a second laser at a second optical wavelength with information carried by a second modulation signal to produce a second modulated light signal, the second tunable modulator configured to be tunable to a second desired bias loss based on the second optical signal before the second tunable modulator and the second modulated light signal after the second tunable modulator; and
   a second tunable filter multiplexer configured to add the said second modulated light signal onto the optical bus with the first modulated light signal to produce the combined modulated signal and passing other light to a second through output, the second tunable filter multiplexer capable of being tuned, based on minimizing light at the second through output.

2. The WDM transmitter system of claim 1, wherein each of the first and second filter multiplexers comprises a micro-ring filter multiplexer;
   wherein each of the first and second tunable modulators comprises a micro-ring modulator; and
   wherein the first and second filter multiplexers, and the first and second tunable modulators are disposed on a single chip.

3. The WDM transmitter system of claim 1, further comprising:
   a first signal splitter situated between said first laser and said first tunable modulator for tapping off a portion of the first optical signal;
   a first optical detector configured to receive the portion of the first optical signal for generating a first photo current;
   a second signal splitter situated between said first tunable modulator and said first filter multiplexer for tapping of a portion of the first modulated light signal; and
   a second optical detector configured to receive the portion of the first modulated light signal for generating a second photo current,
   wherein the first tunable modulator is configured to be tuned until the first desired bias loss is achieved based on the first and second photo currents.

4. The WDM transmitter system of claim 3, wherein the first tunable modulator is configured to be tunable to provide a modulator resonance slightly off the first optical wavelength to generate a first desired extinction ratio.

5. The WDM transmitter system of claim 4, wherein the second tunable modulator is configured to be tunable to provide a modulator resonance slightly off the second optical wavelength to generate a second desired extinction ratio.

6. The WDM transmitter system of claim 3, further comprising:
   a third optical detector configured to receive the other light from the first though output;
   wherein the first tunable filter multiplexer is tuned to minimize loss of the first modulated light signal based on the other light received at the third optical detector.

7. The WDM transmitter system of claim 6, wherein the first tunable filter multiplexer is configured for tuning until the first optical wavelength is at a peak of the first filter multiplexer.

8. The WDM transmitter system of claim 6, wherein the third optical detector generates a third photo current from the other light;
   wherein the first filter multiplexer is capable of being tuned until the third photo current is minimized.

9. The WDM transmitter system of claim 1, wherein the first filter multiplexer comprises a multiple ring filter to increase an FSR of the first filter element and reduce interference between the first and second modulated light signals.

10. The WDM transmitter system of claim 1, further comprising:
    a third tunable modulator configured to modulate a third optical signal at a third optical wavelength with information carried by a third modulation signal to produce a third modulated light signal, the third tunable modulator configured to be tunable to provide a modulator resonance wavelength to generate a third desired extinction ratio;
    a third filter multiplexer configured to add the third modulated light signal onto the optical bus with the first and second modulated light signals to produce the combined modulated signal.

11. The WDM transmitter system of claim 1, further comprising:
    a first filter demultiplexer configured to receive an input optical signal from the optical bus; and
    a detector coupled to the first filter demultiplexer for recovering information encoded on the input optical signal.

12. A method of operating a WDM transmitter system, comprising:
    modulating a first optical signal at a first optical wavelength with information carried by a first modulation signal to produce a first modulated light signal using a first tunable modulator;
    tuning the first tunable modulator based on intensities of the first optical signal before the first tunable modulator and the first modulated light signal after the first tunable modulator to a first desired bias loss;
    adding said first modulated light signal onto the optical bus and passing other light to a first through port using a first filter multiplexer;
    tuning the first filter multiplexer based on the light at the first through port;
    modulating a second optical signal at a second optical wavelength with information carried by a second modulation signal to produce a second modulated light signal using a second tunable modulator;
    tuning the second tunable modulator based on intensities of the second optical signal before the second tunable modulator and the second modulated light signal after the second tunable modulator to a second desired bias loss;

adding the second modulated light signal onto the optical bus with the first modulated light signal to produce the combined modulated signal, and passing other light to a second through port using a second filter multiplexer; and tuning the second filter multiplexer based on the light at the second through port.

13. The method of claim 12, further comprising:
tapping off a portion of the first optical signal using a first signal splitter situated between said first laser and said first tunable modulator;
generating a first photo current in a first optical detector configured to receive the portion of the first optical signal;
tapping off a portion of the first modulated light signal using a second signal splitter situated between said first tunable modulator and said first filter multiplexer; and
generating a second photo current in a second optical detector configured to receive the portion of the first modulated light signal;
tuning the first tunable modulator until the first desired bias loss is achieved based on the first and second photo currents.

14. The method of claim 12, wherein the step of tuning the first tunable modulator comprises tuning the first tunable modulator to provide a first modulator resonance slightly off the first optical wavelength to generate a first desired extinction ratio.

15. The method of claim 14, wherein the step of tuning the second tunable modulator comprises tuning the second tunable modulator to provide a second modulator resonance slightly off the second optical wavelength to generate a second desired extinction ratio.

16. The method of claim 13, further comprising:
receiving the other light using a third optical detector via the first through output; and
tuning the first tunable filter multiplexer to minimize loss of the first modulated light signal based on the other light received at the third optical detector.

17. The method of claim 16, wherein the step of tuning the first filter multiplexer includes tuning the first filter multiplexer until the first optical wavelength is at a peak of the first filter multiplexer.

18. The method of claim 16, further comprising:
generating a third photo current in the third optical detector from the other light;
wherein the step of tuning the first tunable filter multiplexer comprises tuning the first tunable filter multiplexer until the third photo current is minimized.

19. The method of claim 1, further comprising:
receiving an input optical signal from the optical bus at a first filter demultiplexer; and
recovering information encoded on the input optical signal using a detector coupled to the first filter demultiplexer.

* * * * *